United States Patent Office 2,873,611
Patented Feb. 17, 1959

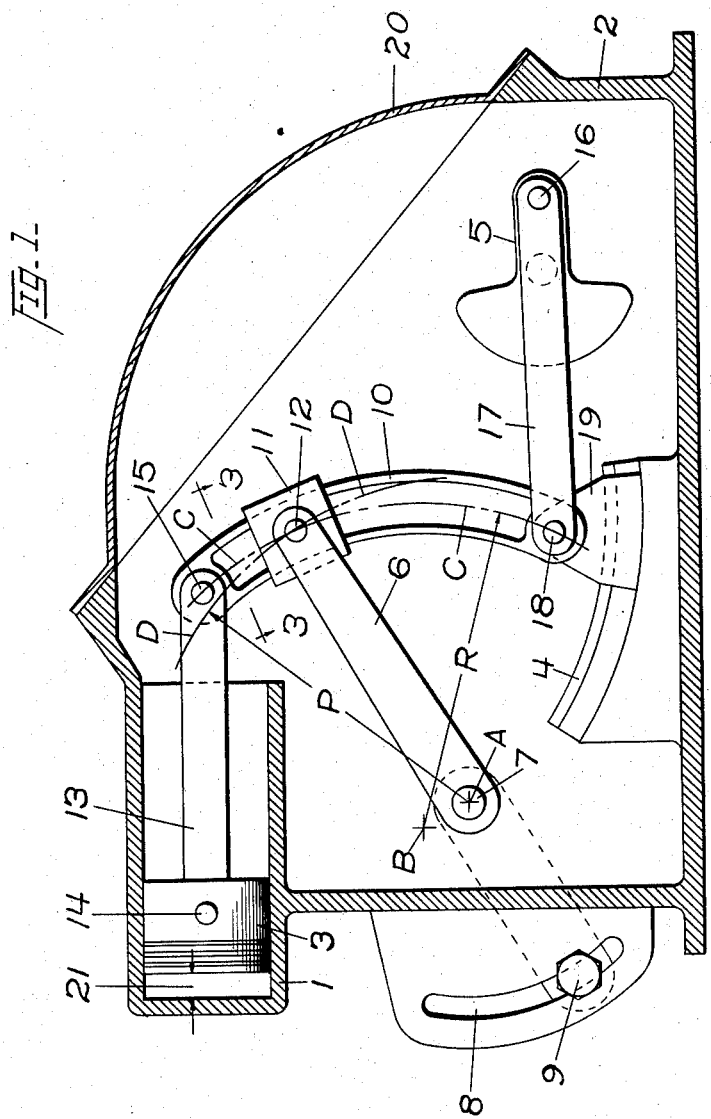

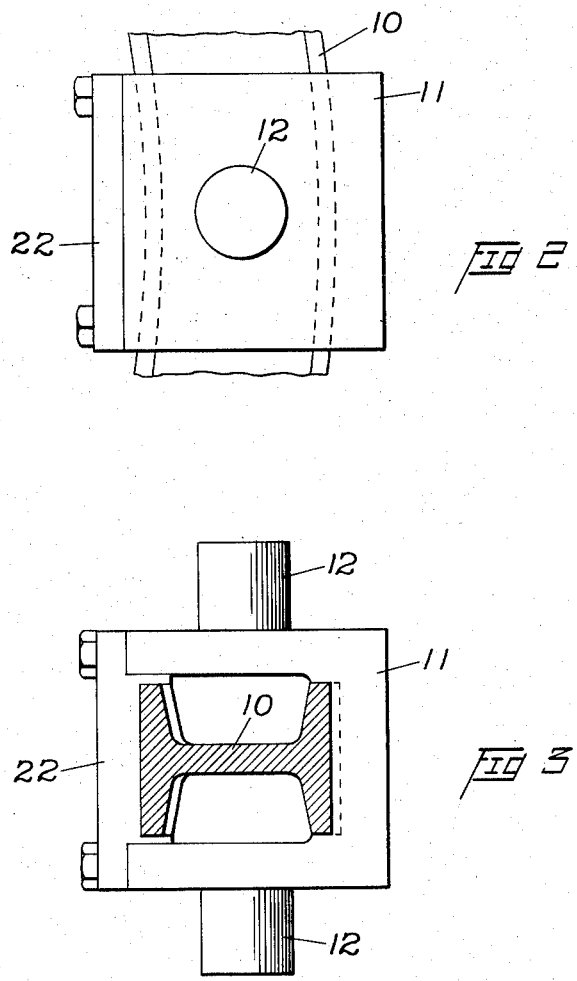

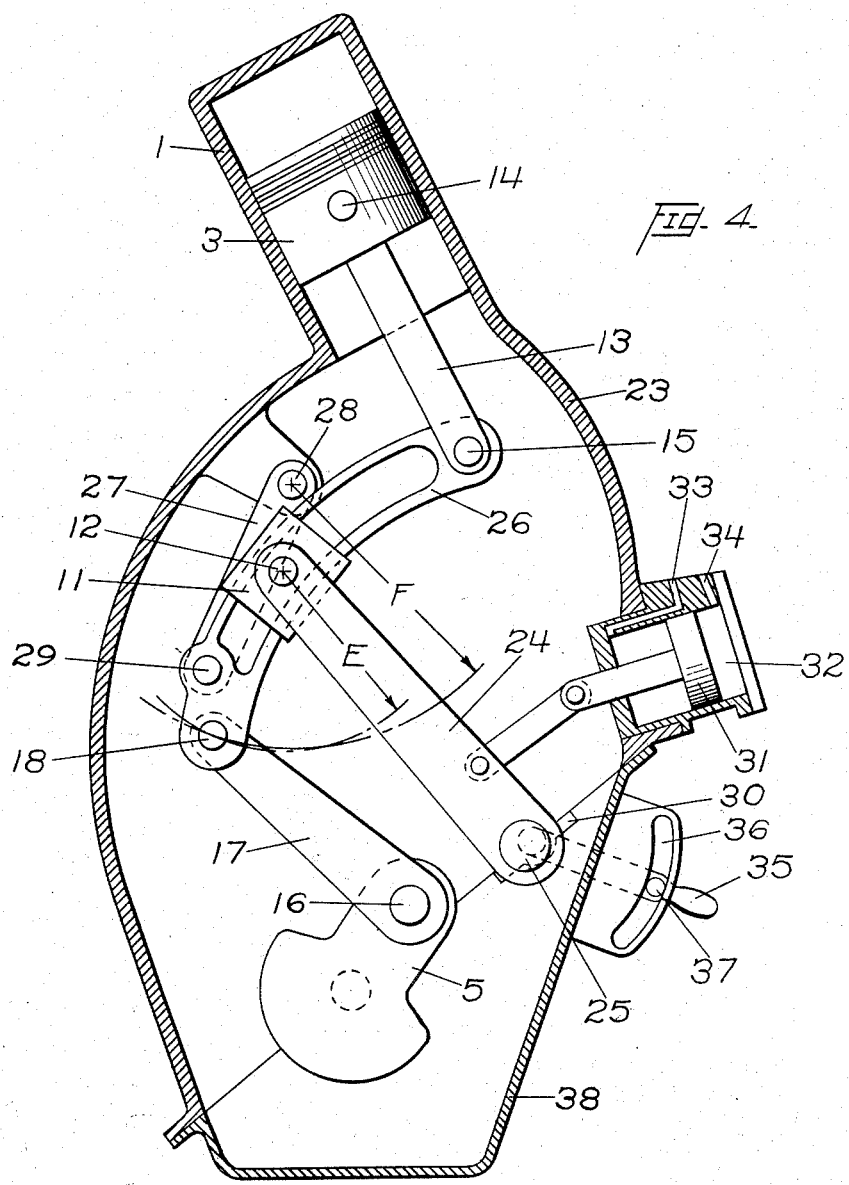

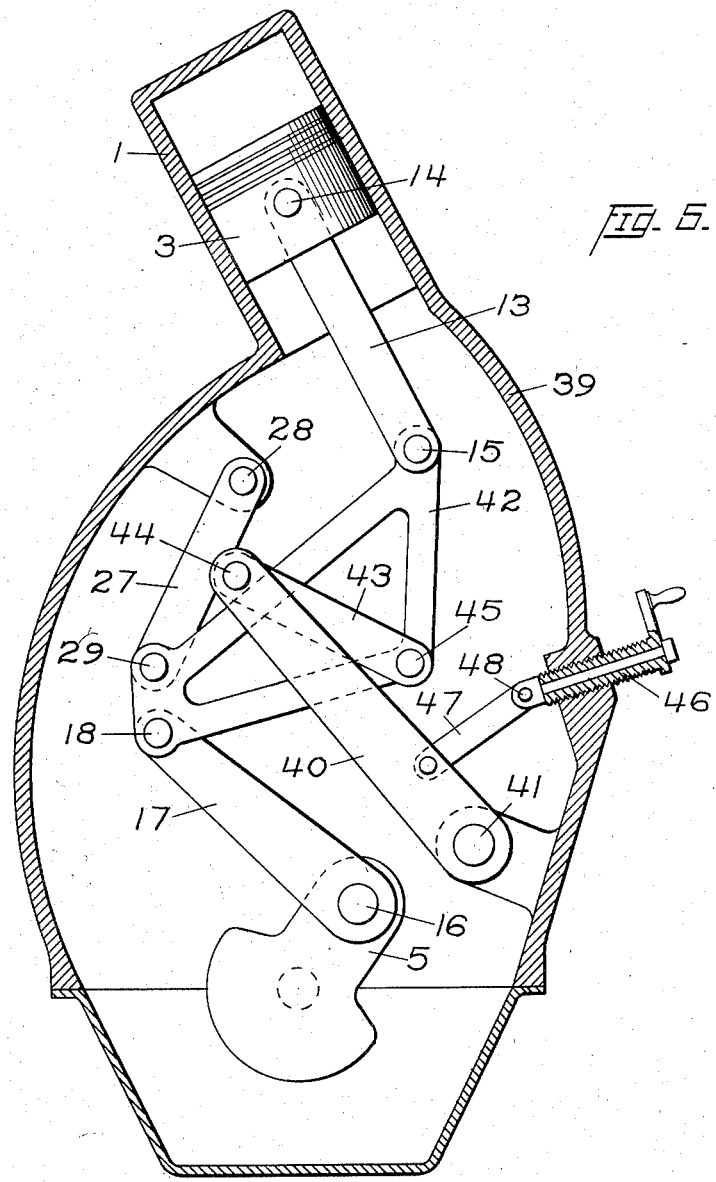

2,873,611

VARIABLE STROKE MECHANISMS

Arnold E. Biermann, Fairview Park, Ohio

Application July 1, 1955, Serial No. 519,316

10 Claims. (Cl. 74—40)

This invention relates to variable stroke mechanisms of the lever type in which the fulcrum for the lever is movable with respect to the lever in order to vary the piston stroke. The main object of the invention is to provide a practical means for moving the fulcrum to obtain specific combinations of stroke and initial position of the stroke at one end of the stroke.

This invention is of particular value for internal combustion engines. In this field it is desirable to specifically control the compression ratio of the cylinder and piston as the piston stroke is varied. The compression ratio is defined as the sum of the volume displaced by the piston movement plus the clearance volume between the piston at top center and the cylinder head divided by the clearance volume. (For valve-in-head, flat, cylindrical combustion chambers the compression can be given in terms of piston stroke and the clearance between piston and cylinder head.) With long piston strokes it is desirable to employ low compression ratios in order to avoid fuel knock and to achieve smooth operation. Higher compression ratios may be employed with intermediate and short piston strokes in order to obtain better fuel economy.

Another application for the subject invention lies in the compressor field where it is desirable to vary piston stroke to control capacity when driven by constant speed machines. In compressors it is desirable to maintain the piston clearance at a minimum value regardless of stroke in order to achieve high volumetric efficiencies.

These and other advantages of the invention will be described in the following in which:

Figure 1 is a schematic, cross-sectional view illustrating one form of the main elements of my invention.

Figure 2 is a side view of the crosshead 11 of Fig. 1.

Figure 3 is a top view of the crosshead taken through 3—3 of Fig. 1.

Figure 4 is a schematic, cross-sectional view illustrating another form of my invention.

Figure 5 is a schematic, cross-sectional view illustrating another form of my invention.

In the embodiment of my invention shown in Figs. 1 to 3 inclusive, the engine comprises a frame or housing 2 upon which is mounted one or more cylinders 1, pistons 3, and a curved cross-slide 4. The crankshaft 5 is journaled in frame 2 as shown and the stroke change arm 6 is pivoted to frame 2 by means of shaft 7. The stroke-change arm 6 is adjustably positioned in the engine frame by means of quadrant 8 and bolt 9.

Rocker lever 10 is adjustably fulcrumed to the stroke-change arm 6 by means of the crosshead 11 through crosshead pins 12. The piston 3 is connected with the rocker lever 10 by means of connecting link 13 and piston pin 14 and rocker link pin 15. Crankpin 16 of the crankshaft 5 is connected to rocker lever 10 through the connecting rod 17 and pin 18. Rocker lever 10 is supported by slipper 19 in the curved cross-slide 4. The engine frame is made accessible by means of cover 20.

Figures 2 and 3 illustrate the construction of the curved crosshead 11. The removable plate 22 facilitates manufacture and permits adjustment for wear.

In Fig. 1, line C which passes through the center of the rocker lever 10, is constructed by means of radius R from the center B. Arc D is the path of the center of crosshead pin 12. The radius of arc D is P. The center of radius P is at A which is also the center of pivot shaft 7.

In the design of variable stroke compressors it is often desirable to hold the piston clearance 21 at a minimum constant value as the piston stroke is varied. This requirement may be achieved by making radius P equal to radius R and by making center B coincide with center A. With this construction and with the piston at top center (top center is defined as the position of the piston nearest the cylinder head), the stroke-change arm 6 may be moved through-out its travel without moving the piston. Consequently the piston clearance remains constant.

When this mechanism is employed in a variable stroke internal combustion engine it is desirable to increase the piston clearance 21 as the stroke is increased. In this manner the compression ratio of the engine may be held constant or varied according to the characteristics desired. Piston clearance may be increased as stroke is increased by displacing center A downward from B as shown in Fig. 1.

Further variations of piston clearance and compression ratio with piston stroke may be obtained by making the radius P of different length than radius R. For example, if radius P is made longer than radius R and if the radius center B is moved so that arcs C and D intersect at both short and long stroke positions then the compression ratio at intermediate length strokes will be higher than the compression ratios at very short or very long strokes. This particular variation of compression ratio with piston stroke is very desirable. At the very short strokes the minimum clearance between the piston and cylinder head must be of considerable magnitude to allow for carbon deposits, consequently the compression ratio at very low strokes is of necessity, somewhat greater than for intermediate strokes. At very long piston strokes the torque and power produced is large and for a given engine flywheel the angular variation in crankshaft movement will be exceptionally high if the high cylinder pressures accompanying high compression ratios are employed.

In the embodiment of the invention shown in Fig. 4, cylinder 1, piston 3 and crank 5 are mounted on engine frame 23. The stroke-change arm 24 is pivoted on the eccentric shaft 25 which is journaled in cap 30 and frame 23. Rocker lever 26 is slidably mounted in crosshead 11 which is supported on stroke-change arm 24 by means of pins 12. The rocker lever 26 is guided in the engine frame by means of the support link 27 which is pivoted to frame 23 by means of pin 28 and which is pivoted to rocker-lever 26 by means of pin 29.

Rocker lever 26 is connected with piston 3 by means of link 13 and pins 14 and 15. Crankpin 16 is connected with rocker lever 26 by means of the connecting rod 17 and pin 18.

The position of the stroke-change arm 24 is adjustably positioned by means of the hydraulic-actuated piston 31 operating in cylinder 32. Hydraulic fluid from an external source is supplied to ports 33 and 34 for actuation of said piston.

The eccentric shaft 25 is adjustably positioned in order to vary the compression ratio of the engine by moving arm 35 which is fastened to shaft 25. Arm 35 is held in quadrant 36 by means of bolt 37. Quadrant 36 is supported on the lower crankcase 38.

In the operation of the mechanism shown in Fig. 4 the piston stroke is varied by changing the angular position of the stroke-change arm 24. The compression ratio for all stroke positions may be varied by adjusting the position of the eccentric 25. This adjustment is particularly valuable when changing from one fuel to another of different anti-knock value.

It will be observed that the construction of Fig. 4 differs from that of Fig. 1 in the method of support or guidance of the rocker lever and also in the position of the crank with respect to the stroke-change arm mounting pivot.

In the mechanism of Fig. 4 it will be observed that if the pivot 12 were fixed to rocker lever 26 and support link 27 removed that piston 3 would travel farther in the 90 degrees of crank rotation adjacent to top center position than in the 90 degrees of crank rotation adjacent to bottom center position. This non-uniform or unharmonic motion is caused by the angularity of the connecting rod and links. Because of difficulty in securing satisfactory balance of such a mechanism this deviation from simple harmonic motion is undesirable. For purposes of this specification, harmonic motion is defined as that motion producing equal piston travel for each 90 degrees of crank rotation starting from one end of the piston stroke.

One method of minimizing such unharmonic motion is to cyclically change the rocker-lever arm length as is necessary. In this invention the piston stroke nearest top center is increased in the corresponding 90 degrees of crank travel by sliding the rocker lever pivot 18 toward pivot 28. This movement is produced by swinging pin 18 along the arc produced by radius F whereas if normally allowed to pivot about pivot 12 pin 18 would follow the arc produced by radius E. The difference in the arcs produced by radii E and F thus contributes to a change in the rocker lever arm, and in this manner contributes to harmonic motion.

Fig. 5 shows a further embodiment of the invention in which the curved rocker of the mechanism of Fig. 4 is replaced by an equivalent structure. In Fig. 5 cylinder 1, piston 3 and crank 5 are mounted on engine frame 39. The stroke change arm 40 is pivoted to the frame through pin 41. Rocker lever 42 is guided in the engine frame 39 by means of support link 27 which is pivoted to the frame by means of pin 28 and to the rocker lever by means of pin 29. Rocker lever 42 is pivotably mounted on stroke-change arm 40 by means of the swing link 43 and pins 44 and 45.

The position of the stroke-change arm 40 is adjustably controlled by means of the screw 46, the actuating link 47 and the screw coupling rod 48.

In the design of the mechanism shown in Fig. 5 an approximation to harmonic motion is obtained, as was done in the design of Fig. 4, by suitably placing pivots 28, 18 and 44 in proper relationship with each other.

In Fig. 5 the main pivotal action of the rocker-lever occurs around pivot 44. Very little cyclic movement occurs around pivot 45. This design eliminates the sliding of crosshead 11, of Fig. 4, along the rocker lever and is a preferred arrangement in this respect.

From the foregoing description and accompanying drawings it will now be readily understood that I have provided a variable-stroke mechanism of compact, practical and efficient design in which are provided:

(a) Means for obtaining preselected variations of compression ratio with piston stroke.

(b) Means for obtaining approximate harmonic motion of the piston.

(c) Means for adjustably varying the compression ratio.

While I have illustrated and described my improved engine mechanism in considerable detail it will be understood, of course, that I do not wish to be correspondingly limited, but regard my invention as including all changes and modifications coming within the spirit of the invention and the scope of the appended claims.

Having thus described my invention, I claim:

1. In a variable-stroke piston mechanism having a frame, a cylinder and piston in said frame, a combination comprising a crank journaled in said frame, a stroke-change arm pivotably mounted on said frame, a pivot on said stroke-change arm, a rocker lever mounted to oscillate on said pivot, a link connecting said piston and said rocker lever, a connecting rod connecting said crank and said rocker lever, means for guiding said rocker lever, said pivot being movable along said arcuate rocker lever for varying the stroke of said piston, the location of the center of the radius of said curve of said rocker lever being offset from said mounting pivot of said stroke-change arm an amount sufficient to provide a preselected variation of compression ratio with change of piston stroke length.

2. In a variable stroke piston mechanism having a frame, a cylinder and piston in said frame, a combination comprising a crank journaled in said frame, a stroke-change arm pivotably mounted on said frame, a pivot on said stroke-change arm, an arcuate rocker lever mounted to oscillate on said pivot, a link connecting said piston and said rocker lever, a connecting rod connecting said crank and said rocker lever, means for guiding said rocker lever in said frame, said pivot being movable on the arc of a circle on said rocker lever for varying the stroke of said piston, the radius of said stroke-change arm from said mounting pivot to said pivot being of such length with respect to the length of the radius of the arc of said rocker lever as to provide a preselected variation of compression ratio with change of piston stroke length.

3. In a variable stroke piston mechanism having a frame; a cylinder and piston in said frame, a combination comprising a crank journaled in said frame, a stroke-change arm pivotably mounted on said frame, a pivot on said stroke-change arm an arcuate rocker lever mounted to oscillate on said pivot, a link connecting said piston and said rocker lever, a connecting rod connecting said crank and said rocker lever, said pivot being movable along the arc of a circle on said rocker lever for varying the stroke of said piston, a support link pivoted to said rocker lever and pivoted to said frame for guiding said rocker lever to cyclically vary the lever arm of said rocker lever to produce substantially equal piston travel for each 90 degrees of crank rotation from the crank position at the end of the stroke of said piston.

4. In a variable stroke piston mechanism having a frame, a cylinder and a piston in said frame, a combination comprising a crank journaled in said frame, a stroke-change arm pivotably mounted on said frame, a fulcrum on said stroke-change arm, a rocker lever mounted to oscillate on said fulcrum, a link connecting said piston and said rocker lever, a connecting rod connecting said crank and said rocker lever, a support link pivoted to said rocker lever and pivoted to said frame for guiding said rocker lever in such a manner as to shorten the lever arm of said rocker lever extending from said rocker lever fulcrum to the attachment of said connecting rod to said rocker lever when said crank is moving in that semicircle of its travel farthest from said connecting rod attachment to said rocker lever.

5. In a variable piston-stroke mechanism having a frame, a cylinder and a piston on said frame, a combination comprising a crank journaled in said frame, a stroke-change arm pivoted on said frame, a swing-link pivoted to said stroke-change arm, a rocker lever pivoted to said swing link, a link connecting said piston and said rocker lever, a connecting rod connecting said crank and said rocker lever, a support link pivoted on said frame and on said rocker, means for adjustably positioning said stroke-change arm to vary the stroke of said piston.

6. In a variable stroke piston mechanism having a frame, a cylinder mounted on said frame, and a piston reciprocable in said cylinder, a combination comprising a crank journaled in said frame, a pivot adjustably mounted on said frame to move along the arc of a circle identified as the stroke-change arc, a lever mounted for oscillation on said pivot, means for adjustably moving said pivot along the arc of a circle on said lever identified as the lever arc, a piston rod connecting said piston and said lever, a crank rod connecting said crank and said lever, the divergence of said stroke-change arc from said lever arc being such as to provide a pre-selected variation of compression ratio with variation of piston stroke.

7. In a variable stroke piston mechanism, a frame, a cylinder mounted on said frame, a piston reciprocable in said cylinder, a crank journaled in said frame, a stroke change arm journaled in said frame, pivot support means on said stroke change arm, a rocker lever mounted to oscillate on said pivot support means, a link connecting said piston and said rocker lever, a crank rod connecting said crank and said rocker lever, means for pivotably supporting said rocker lever on said frame, said pivot being movable along an arc of a circle on said rocker lever for varying the stroke of said piston, the location of the radius center of said arc of a circle on said rocker lever being offset from said stroke change arm journal to provide a pre-selected variation of the compression ratio of said cylinder and said piston as piston stroke is varied.

8. In a variable stroke mechanism for a piston-type internal combustion engine, a frame, a cylinder mounted on said frame, a piston reciprocable in said cylinder, a crank journaled in said frame, an eccentric journaled in said frame, a pivot adjustably mounted on said eccentric to move along the arc of a circle identified as the stroke-change arc, a lever mounted for oscillation on said pivot, means for adjustably moving said pivot along the arc of a circle on said lever identified as the lever arc, a piston rod connecting said piston and said lever, a crank rod connecting said crank and said lever, the divergence of said stroke-change arc from said lever arc being such as to provide a preselected variation of compression ratio with variation of piston stroke, said eccentric being angularly adjustable for changing the compression ratio independently of piston stroke.

9. In a variable stroke piston mechanism, a frame, a cylinder mounted on said frame, a piston reciprocable in said cylinder, a crank journaled in said frame, a stroke change arm pivoted on said frame, a support link pivoted on said frame, a rocker lever pivoted on said support link, a swing link connecting said rocker lever and said stroke change arm, a piston rod connecting said piston and said rocker lever, and a crank rod connecting said crank and said rocker lever, the length of said swing link being substantially equal to the distance between the attachment point of said piston rod on said rocker lever and the attachment point of said swing link on said rocker lever.

10. In a variable stroke piston mechanism, a frame, a cylinder and piston mounted on said frame, a crank journaled in said frame, a stroke change arm pivoted on said frame, A support link pivoted on said frame, a rocker lever pivoted on said support link, a swing link connecting said rocker lever and said stroke change arm, a piston rod connecting said piston and said rocker lever and a crank rod connecting said crank and said rocker lever, said rocker lever forming a trapezium with connection points on the apexes of said trapezium, said piston rod and said crank rod being attached to opposite apexes of said trapezium and said swing link and said rocker link being attached to opposite apexes of said trapezium.

References Cited in the file of this patent

UNITED STATES PATENTS

| | | |
|---|---|---|
| 680,237 | Eudelin | Aug. 13, 1901 |
| 1,095,675 | Rietti | May 5, 1914 |
| 1,189,312 | Tibbels | July 4, 1916 |
| 1,443,719 | Schott | Jan. 30, 1923 |
| 1,818,807 | Mann | Aug. 11, 1931 |
| 1,909,372 | McCollum et al. | May 16, 1933 |
| 1,968,030 | De Filippis | July 31, 1934 |
| 2,262,915 | Bobst | Nov. 18, 1941 |
| 2,776,573 | Willi | Jan. 8, 1957 |

FOREIGN PATENTS

| | | |
|---|---|---|
| 207,108 | Germany | Feb. 20, 1909 |
| 378,368 | France | Aug. 8, 1907 |
| 923,297 | France | Feb. 17, 1947 |